United States Patent
Chang

(10) Patent No.: US 7,877,390 B2
(45) Date of Patent: Jan. 25, 2011

(54) SYSTEMS AND METHODS FOR PROVIDING AUTONOMOUS PERSISTENT STORAGE SYSTEMS

(75) Inventor: Yuan-Chi Chang, New York, NY (US)

(73) Assignee: International Business Machines Corporation, Armonk, NY (US)

(*) Notice: Subject to any disclaimer, the term of this patent is extended or adjusted under 35 U.S.C. 154(b) by 682 days.

(21) Appl. No.: 10/689,091

(22) Filed: Oct. 20, 2003

(65) Prior Publication Data

US 2005/0086236 A1  Apr. 21, 2005

(51) Int. Cl.
G06F 7/00 (2006.01)

(52) U.S. Cl. .................... 707/741; 707/758; 707/802

(58) Field of Classification Search ........... 707/103, 707/104.1, 104, 100, 105, 101, 10, 13, 1, 707/3, 802, 696, 711, 741, 999.002, 999.004
See application file for complete search history.

(56) References Cited

U.S. PATENT DOCUMENTS

| | | | | |
|---|---|---|---|---|
| 5,295,256 A * | 3/1994 | Bapat | ................... | 717/137 |
| 5,297,279 A * | 3/1994 | Bannon et al. | ........... | 707/103 R |
| 5,727,203 A * | 3/1998 | Hapner et al. | ........... | 1/1 |
| 5,797,007 A * | 8/1998 | Erickson et al. | ......... | 712/300 |
| 5,809,507 A * | 9/1998 | Cavanaugh, III | ........ | 707/103 R |
| 5,809,509 A * | 9/1998 | Blackman et al. | ........ | 1/1 |
| 5,870,742 A | 2/1999 | Chang et al. | ........... | 707/8 |
| 5,940,827 A * | 8/1999 | Hapner et al. | ........... | 707/703 |
| 6,219,673 B1 * | 4/2001 | Blackman et al. | ........ | 1/1 |
| 6,249,844 B1 * | 6/2001 | Schloss et al. | ............ | 711/122 |
| 6,314,418 B1 * | 11/2001 | Namba | ............... | 707/696 |
| 6,446,081 B1 * | 9/2002 | Preston | ................ | 1/1 |
| 6,453,319 B1 * | 9/2002 | Mattis et al. | ............. | 1/1 |
| 6,453,320 B1 * | 9/2002 | Kukura et al. | ............ | 707/791 |
| 6,470,344 B1 * | 10/2002 | Kothuri et al. | ........... | 707/100 |
| 6,567,820 B1 | 5/2003 | Scheifler et al. | .......... | 707/103 |
| 6,591,272 B1 * | 7/2003 | Williams | ............... | 1/1 |
| 6,631,519 B1 * | 10/2003 | Nicholson et al. | ........ | 717/169 |
| 6,732,095 B1 * | 5/2004 | Warshavsky et al. | ..... | 1/1 |
| 6,766,326 B1 * | 7/2004 | Cena | .................... | 707/808 |
| 6,785,673 B1 * | 8/2004 | Fernandez et al. | ........ | 1/1 |
| 6,836,778 B2 * | 12/2004 | Manikutty et al. | ........ | 1/1 |
| 6,865,657 B1 * | 3/2005 | Traversat et al. | ......... | 711/170 |
| 7,024,656 B1 * | 4/2006 | Ahad | ................... | 717/116 |
| 7,028,025 B2 * | 4/2006 | Collins | ................. | 707/3 |
| 7,185,075 B1 * | 2/2007 | Mishra et al. | ........... | 709/223 |
| 2003/0140308 A1 * | 7/2003 | Murthy et al. | ........... | 715/500 |
| 2004/0098422 A1 * | 5/2004 | Levesque et al. | ......... | 707/203 |

OTHER PUBLICATIONS

Sherif Danish, *Building Database-driven Electronic Catalogs*, ACM Sigmod Record, vol. 27, No., Dec. 1998.

Dirk Bartels, *ODMG 93—The Emerging Object Database Standard*, Data Engineering, 1996, Proceedings of the 12 Int'l. Conference in New Orleans, LA, Feb. 26 to Mar. 1, 1996.

* cited by examiner

*Primary Examiner*—Eliyah S Harper
(74) *Attorney, Agent, or Firm*—F. Chau & Associates, LLC

(57) ABSTRACT

Systems, methods and services for generating autonomous persistent storage systems that are self-configurable and self-managing, based on user-submitted entity definitions. For example, systems and methods are provided for automatically creating and updating persistent storage structures based on entity definitions, automatically populating persistent storage space with instance data of defined entities, automatically generating and adapting methods for accessing instance data in persistent storage, searching instance data and automatically optimizing search methods for instance data, and automatically creating and managing a cache of frequently accessed instance data.

28 Claims, 10 Drawing Sheets

SYSTEMS AND METHODS FOR PROVIDING AUTONOMOUS PERSISTENT STORAGE SYSTEMS

TECHNICAL FIELD

The present invention broadly relates to systems and methods for generating autonomous persistent storage systems that are self-configurable and self-managing. For example, the invention relates to systems and methods for providing autonomous creation, management, maintenance, and optimization of electronic catalogs for implementation with database systems and other information systems.

BACKGROUND

Typically, enterprise software systems such as Human Resource management (HR), Enterprise Resource Planning (ERP), Customer Relationship Management (CRM), Product Lifecycle Management (PLM), and Electronic Commerce (EC), include business management software, such as catalog functions, for managing a database. These enterprise software systems are typically installed and used at companies in many different industries, each of which having unique requirements. These heterogeneous requirements for enterprise systems creates a dilemma from a product development viewpoint, since it would be too bulky and complex to design business management software to accommodate all the various requirements for enterprise systems. On the other hand, a product should have a degree of flexibility to cover a minimal set of common requirements. In the end, a balance is made between the actual features that are shipped with the product releases and the anticipated industry/company-specific customization. One rule of thumb is that for large enterprise software, the cost to customize is three to five times larger than the cost to license a product. This high customization expense has prevented small and medium-sized business from aggressively adopting modern business management software.

The catalog function is one of the software components of an enterprise application that is most commonly customized to meet different needs. For example, with commerce applications in the retail industry, a media chain store may sell CDs and video, wherein the most important catalog data content includes singers, song lists, directors, producers, etc. In contrast, an office supply company may sells pens, pencils, folders, and other common office supplied, wherein the common catalog content concentrates on color, material and manufacturer, for example. The access and storage of information regarding singers, song lists, color and material is quite different. It is thus conceivably difficult to design a catalog to efficiently handle content related to CDs, video, pens, pencils, folders, as well as the millions of other products in retail and other industries.

One reason for the constant struggle between catalog uniformity and product heterogeneity is due to the rigidity of traditional product catalog design. This is evidenced from a number of publications on electronic catalog as well as from the present inventor's experience with electronic commerce server development. The variations of schema design described, for example, in the article by S. Danish, "Building database-driven electronic catalogs," SIGMOD Record, Vol. 27, No. 4, December 1998, and in A. Jhingran, "Anatomy of a real E-commerce system," ACM SIGMOD Proceedings, May 2000) are common choices. But, these techniques and other conventional systems do not adapt well to product heterogeneity.

SUMMARY OF THE INVENTION

Exemplary embodiments of the present invention include systems and methods for generating autonomous persistent storage systems that are self-configurable and self-managing. Exemplary embodiments of the present invention include systems and methods for providing autonomous creation, management, maintenance, and optimization of persistent storage structures, such as directories of objects or electronic catalogs, for implementation with database systems and other information systems.

For example, exemplary embodiments of the invention include systems, methods, and services for automatically creating persistent storage structures and various persisted data management functions, based on user-submitted entity definitions. In one exemplary embodiment of the invention, a method for generating a persistent storage system comprises receiving as input an entity definition, automatically generating a persistent storage structure for a persistent storage medium using the entity definition, and automatically generating an interface for accessing the persistent storage medium. The entity definition may comprise, for example, a declaration of an object, one or more properties of the object, and a data type for each property. In other exemplary embodiments of the invention, the persistent storage structure may be, e.g., a database table or a file directory.

Moreover, exemplary embodiments of the invention further include systems, methods and services that provide mechanisms for: (i) automatically creating and updating persistent storage structures based on entity definitions; (ii) automatically populating persistent storage space with instance data of defined entities; (iii) automatically generating and adapting methods for accessing instance data in persistent storage; (iv) searching instance data and automatically optimizing search methods for instance data; and (v) automatically creating and managing a cache of frequently accessed instance data.

Exemplary systems and methods according to the invention provide mechanisms for automating the catalog lifecycle providing full adaptability to, e.g., heterogeneous product catalog needs, while eliminating the need for human developers to design persistent storage schemes and write software programs for access.

These and other exemplary embodiments, aspects, features, tures, and advantages of the present invention will become apparent from the following detailed description of exemplary embodiments, which is to be read in connection with the accompanying drawings.

DETAILED DESCRIPTION OF EXEMPLARY EMBODIMENTS

Figure 1:
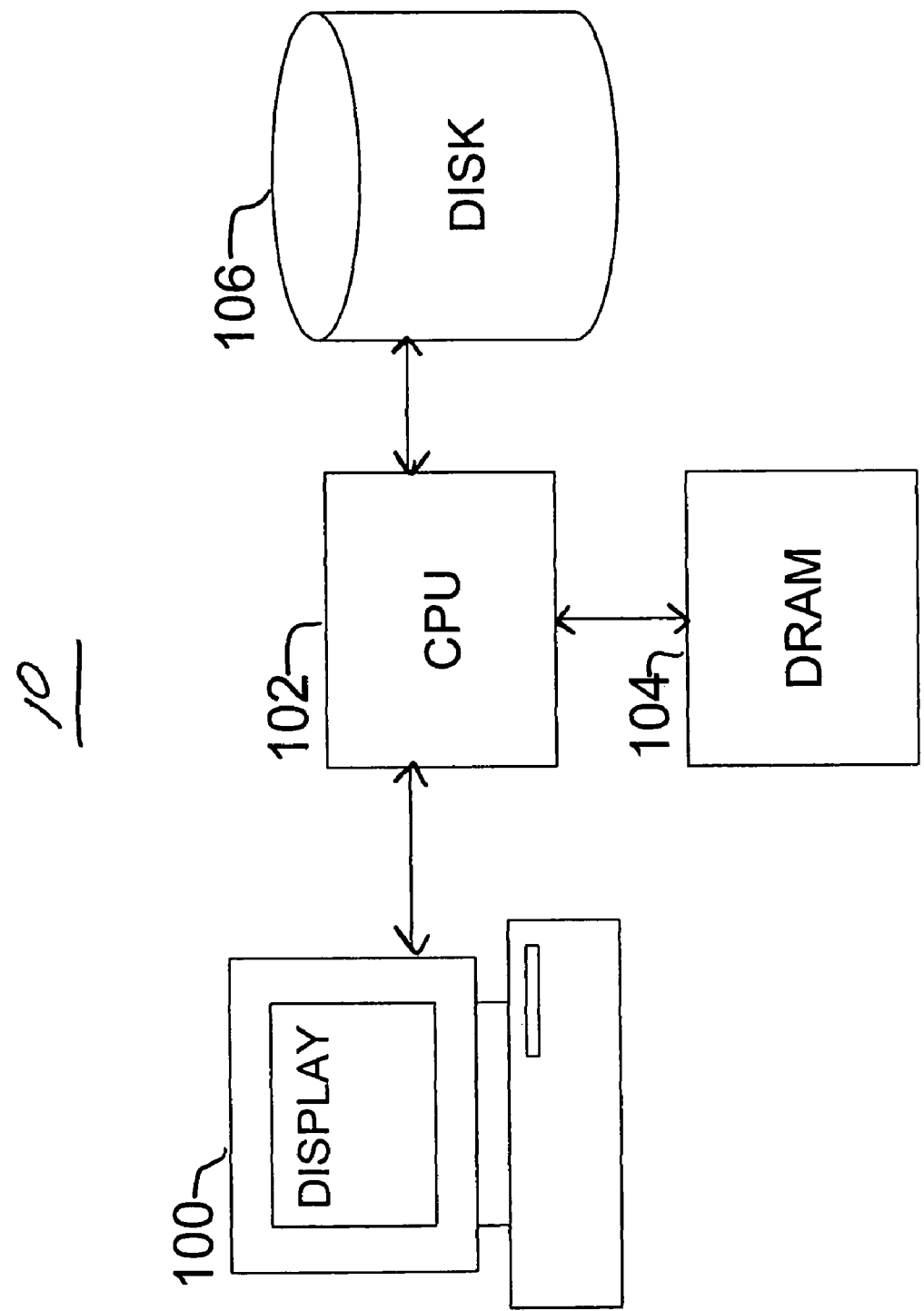
FIG. 1 is a schematic diagram illustrating an operating system that can be used for implementing autonomous persistent storage systems and methods according to exemplary embodiments of the present invention.

Exemplary embodiments of the present invention include systems and methods for generating autonomous persistent storage systems, which are self-configurable, self-managing and self-optimizable. For example, exemplary embodiments of the present invention include systems and methods for providing autonomous creation, management, maintenance, and optimization of persistent storage structures, such as directories of objects or electronic catalogs, for implementation with database systems and other information systems.

In general, exemplary embodiments of the invention include methods for automatically generating persistent storage structures, e.g., electronic catalogs, using an entity description of an entity and associated properties to be stored in a catalog, persistent storage of entity instances that comply with the entity description, as well as methods for automatically, configuring and managing the persistent storage and synthesizing an interface for accessing persisted entity instances.

It is to be understood that the term "database" as used herein is to be broadly construed to include any persistent storage system, such as, for example, relational databases (e.g., IBM DB2 and Oracle 9), file systems (e.g., NTFS), disk management systems (e.g., RAID), etc. For illustrative purposes, exemplary embodiments of the present invention are described with reference to relational database systems, but those of ordinary skill in the art can readily envision other types of persistent storage systems and methods that can be used in lieu of relational databases.

Furthermore, the term "catalog" or "electronic catalog" as used herein should be broadly construed to refer to any directory of entities characterized by properties, For example, a "catalog" may be structured as a database table. It is to be further understood that the term "entity" as used herein is to be broadly construed as referring to any "thing" or "object" that is to be persistently stored. Further, the term "property" as used herein is intended to broadly refer to attributes of an entity. By way of example, an entity named "soda" may be defined having properties (attributes) such as name, flavor, size, manufacturer, nutrition fact, UPC (Universal Product Code), etc. The term "instance" as used herein broadly refers to a physical materialization of an entity. Using the "soda" entity as an example, an instance of "soda" can be, e.g., Diet Coke, manufactured by the Coca Cola Company.

It is to be appreciated that exemplary embodiments of the present invention as described herein can be used to implement, for example, catalog functions in commerce servers, human resource management, enterprise resource planning, procurement systems, supply chain systems, customer relationship management, product lifecycle management, as well as other enterprise software applications. For purposes of illustration and description, exemplary embodiments of the invention will be described herein based on a Java implementation and relational database, although nothing herein shall be construed as limiting the scope of the invention with regard to, e.g., the programming language or persistent storage system.

It is to be understood that the exemplary systems and methods described herein may be implemented in various forms of hardware, software, firmware, special purpose processors, or a combination thereof. In particular, the present invention can be implemented as an application comprising program instructions that are tangibly embodied on one or more program storage devices (e.g., hard disk, magnetic floppy disk, RAM, ROM, CD ROM, etc.) and executable by any device or machine comprising suitable architecture.

It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations or configurations of the present invention.

For example, FIG. 1 is a schematic diagram illustrating an operating system that can be used for implementing an autonomous persistent storage system (e.g., autonomous catalog system) according to an exemplary embodiment of the present invention. The system (10) comprises a user interface (100), CPU (central processing unit) (102), a cache/RAM memory (104) and persistent storage memory (106). The user interface (100), which comprises a display and keyboard, enables a user to interface with an autonomous catalog system which executes in the CPU (102). It is to be understood that the autonomous catalog system may interface with other applications or services using suitable APIs and protocols for computer networking communications, for example. An autonomous catalog system according to an exemplary embodiment of the present invention executes in the CPU (102) and uses the main memory (104) to temporarily store its executable code and data. Furthermore, the disk (106) is used for storing programs and data that require persistence. It is to be understood that the system (10) depicted in FIG. 1 is merely one exemplary embodiment of an operating environment in which autonomous catalog systems and methods according to the present invention can be implemented and executed, and that other suitable operating environments for use with the present invention are can be readily envisioned by one of ordinary skill in the art.

Figure 2:
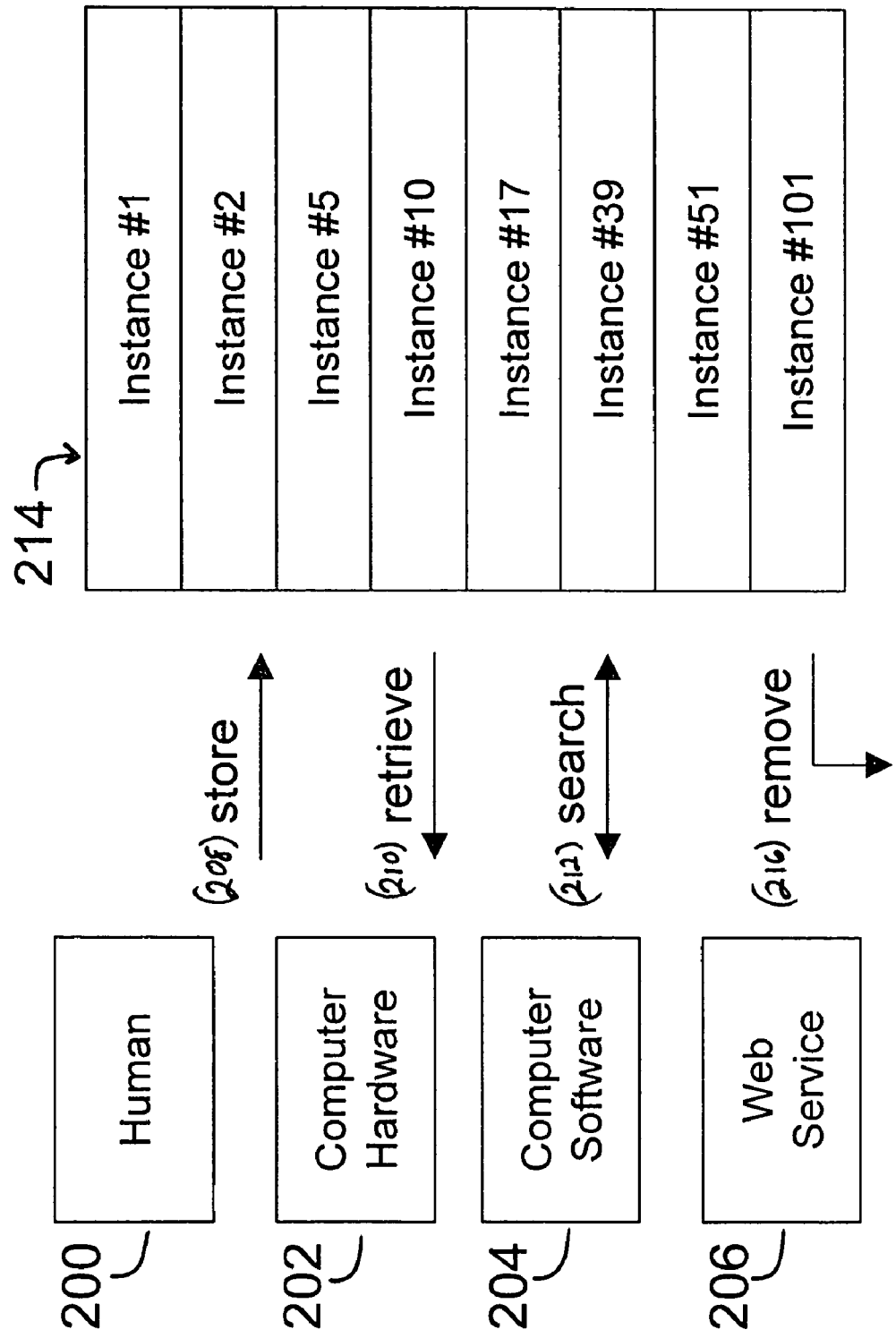
FIG. 2 is an exemplary diagram illustrating functional relationships among entities that may access and interact with an autonomous persistent storage system according to an exemplary embodiment of the present invention.

Referring now to FIG. 2, an exemplary diagram illustrates functional relationships among entities that may access and interact with an autonomous persistent storage system according to an exemplary embodiment of the present invention. FIG. 2 depicts and abstract view of a catalog (214) comprising a directory of entity instances. The instances may or may not belong to the same entity. In accordance with one exemplary embodiment of the invention, an autonomous catalog system supports various access methods including, for example, store (208), retrieve (210), search (212) and remove (216). The store (208) method is used to insert new instances into the catalog (214). The retrieve (210) method is used to obtain a specified instance from the catalog (214) by identifiers. The search (212) method is used to find instances whose property values match specified conditions. The remove (216) method can be optionally implemented to delete specified instances from the catalog (214) by identifiers. The various methods store (208), retrieve (210), search (212) and/or remove (216) may be used various entities, including, for example, human operators (200), computer hardware (202), computer software (204), web services (206), etc., depending on the implementation or purpose of the catalog (214) in a larger enterprise software.

Figure 3:
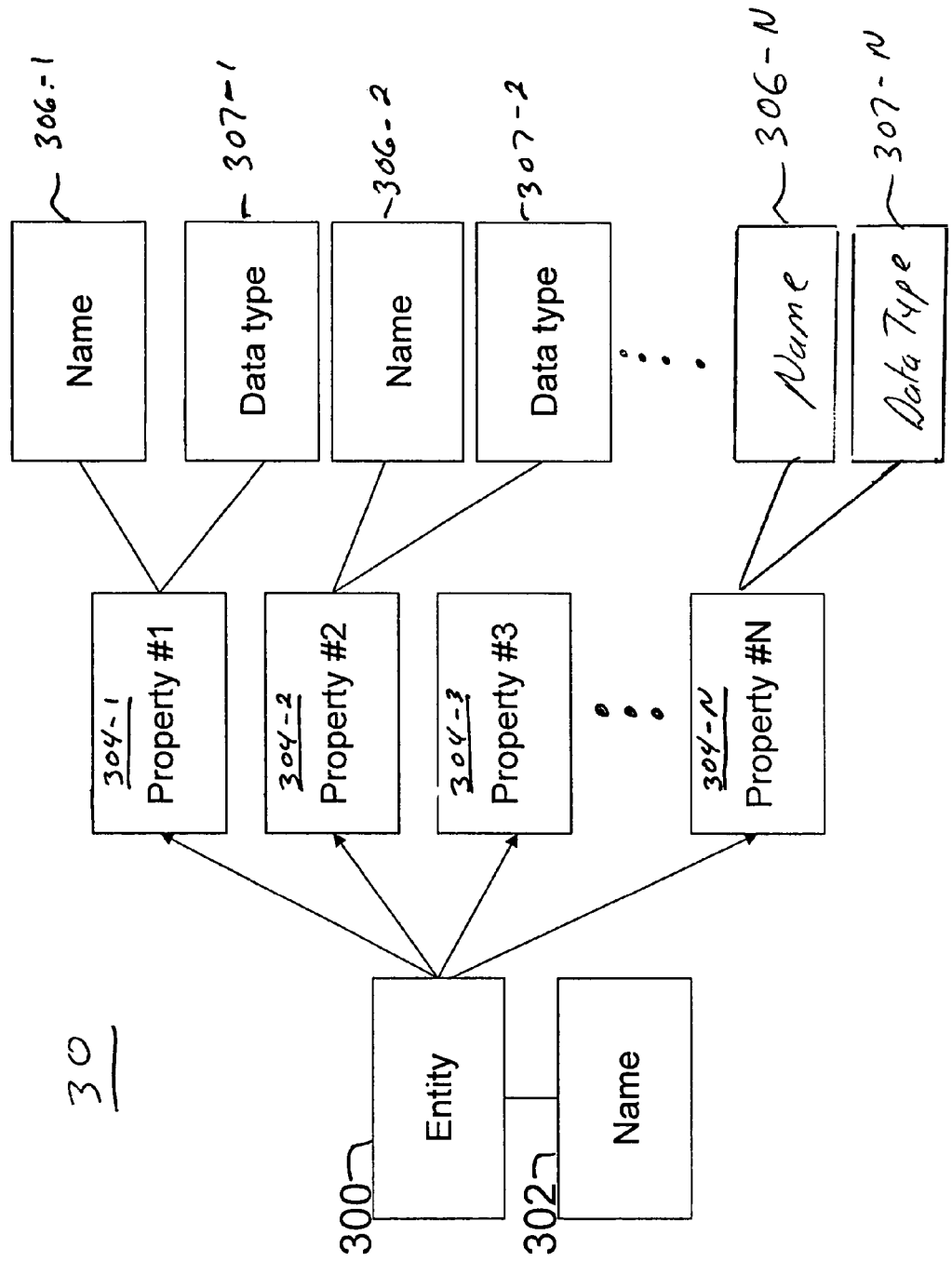
FIG. 3 is an exemplary diagram illustrating an entity-property declaration that may be used for generating an autonomous catalog system according to an exemplary embodiment of the invention.

Referring now to FIG. 3, an exemplary diagram illustrates an entity description (e.g., entity-property declaration), which may be used for generating an autonomous catalog system, according to an exemplary embodiment of the invention. In the illustrative embodiment of FIG. 3, an entity-property declaration (30) comprises an entity (300) having a unique name (302) for identification. The entity (300) comprises a plurality of properties (304-1, 304-2, ..., 1304-N). Each property (304-1, 304-2, ..., 304-N) is identified by a corresponding property name (306-1, 306-2, ... 306-N) and is assigned a corresponding data type (307-1, 307-2, ..., 307-N). The data type field is used for estimating the amount of storage space for the property value. The data types may include, for example, integer, floating point, character strings, byte arrays and other data types known by those of ordinary skill in the art. In one exemplary embodiment of the present invention, new data types can be defined as needed, depending on the application.

It is to be appreciated that in one exemplary embodiment of the invention, the entity-property declaration (30) can be generated using application-dependent methods that are compatible with the programming models of the enterprise software that implements an autonomous catalog system according to the invention. In other exemplary embodiments, the entity-property declaration (30) can be generated using application-independent languages, such as XML, for example, or other suitable extensible languages. It is to be understood that FIG. 3 is merely one illustrative embodiment of an entity description including information that is preferable for implementing an autonomous catalog according to an embodiment of the invention, and that additional information may be used for generating an entity-property declaration depending on the application.

Figure 4:
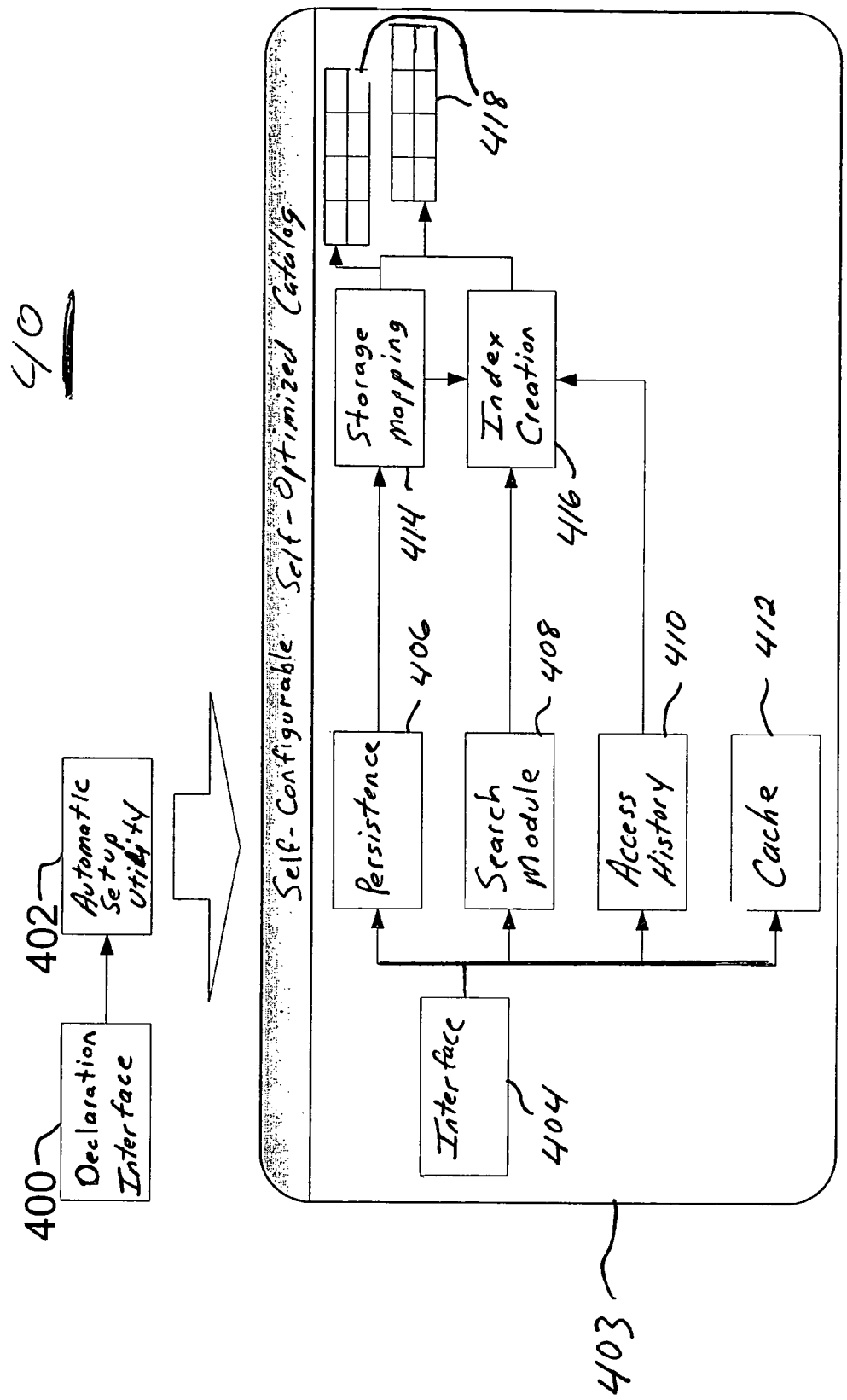
FIG. 4 is a schematic diagram of an autonomous electronic catalog system for a database according to an exemplary embodiment of the invention, which illustrates an exemplary embodiment of an autonomous persistent storage system according to the invention.

FIG. 4 depicts a high-level schematic diagram of an autonomous catalog system according to an exemplary embodiment of the present invention. It is to be understood that FIG. 4 is merely one exemplary embodiment of an autonomous persistent storage system in the form of an electronic catalog system for a relational database. However, as noted above, one of ordinary skill in the art can readily envision other autonomous persistent storage systems that can be implemented in accordance with the teachings of the present invention.

Referring now to FIG. 4, the autonomous catalog system (40) comprises a declaration interface (400) and automatic setup utility (402), which process a entity description to generate an autonomous (self-configurable, self-managed, self-optimized) electronic catalog (403). More specifically, in one exemplary embodiment, self-configuration of the autonomous catalog (403) begins with the declaration interface (400) receiving an entity definition and then interpreting and parsing the entity definition to form logical associations. For example, the declaration interface (400) can parse an entity definition to determine the structure and properties of the data and generate a hierarchically structured tree as depicted in FIG. 3, for example. The declaration interface (400) passes the parsing results (logical associations) to the automatic setup utility (402), which commences a configuration process to generate the autonomous catalog (403) having a plurality of modules.

For example, the autonomous catalog (403) comprises an interface module (404) having access programs that are synthesized to enable access to persisted entities. For example, the interface module (404) comprises methods to get and set property values, as well as searchby property values of persisted entities. A persistence module (406) and storage mapping module (414) function jointly to provide a reliable utility for storing catalog entity instances in database tables (418). A search module (408) provides a method for searching catalog entity instances in the database tables (418). An index creation module (416) provides a method for indexing one or more catalog entity instances, and can be invoked by the search module (408) to improve search performance. An access history module (410) provides a mechanism for controlling the index creation module (416) to create indexes for frequently searched properties. A cache module (412) provides a mechanism for storing recently accessed instances in database tables (418).

In one exemplary embodiment, the system (40) of FIG. 4 comprises modules (400), (402) and (403) comprising modules (404), (406), (414), (408) and (418). In another exemplary embodiment, modules (410), (412), and (416), for example, can be implemented to enhance access and retrieval performance.

It is appreciated that an autonomous persistent storage system, such as depicted in FIG. 4, can be employed for various applications. For instance, such system can be implemented as a component of an enterprise application for providing database management. In addition, an autonomous persistent storage system can be implemented with web/application servers for building e-commerce applications. In addition, an autonomous persistent storage system may be implemented as a service that is accessible on a remote server, wherein a consumer can pay service fees to a service provider based on some fee structure or service level agreement for providing, e.g., secured database management. Those of ordinary skill in the art can readily envision other applications for an autonomous persistent storage system according to the invention.

Details regarding exemplary modes of operation, functions and architectures of the autonomous catalog system (40) modules will now be described in further detail with reference to the exemplary embodiments depicted in FIGS. 5-10, for example. In addition, for illustrative purposes, the exemplary systems and methods depicted in FIGS. 5-10 will be described with reference to an exemplary entity-property declaration for a declared entity Soda, having properties Brand, Size, and UPC. In addition, it is assumed that the property Brand has a "string" data type, the property Size has an "integer" data type and the property UPC has a "string" data type.

Figure 5:
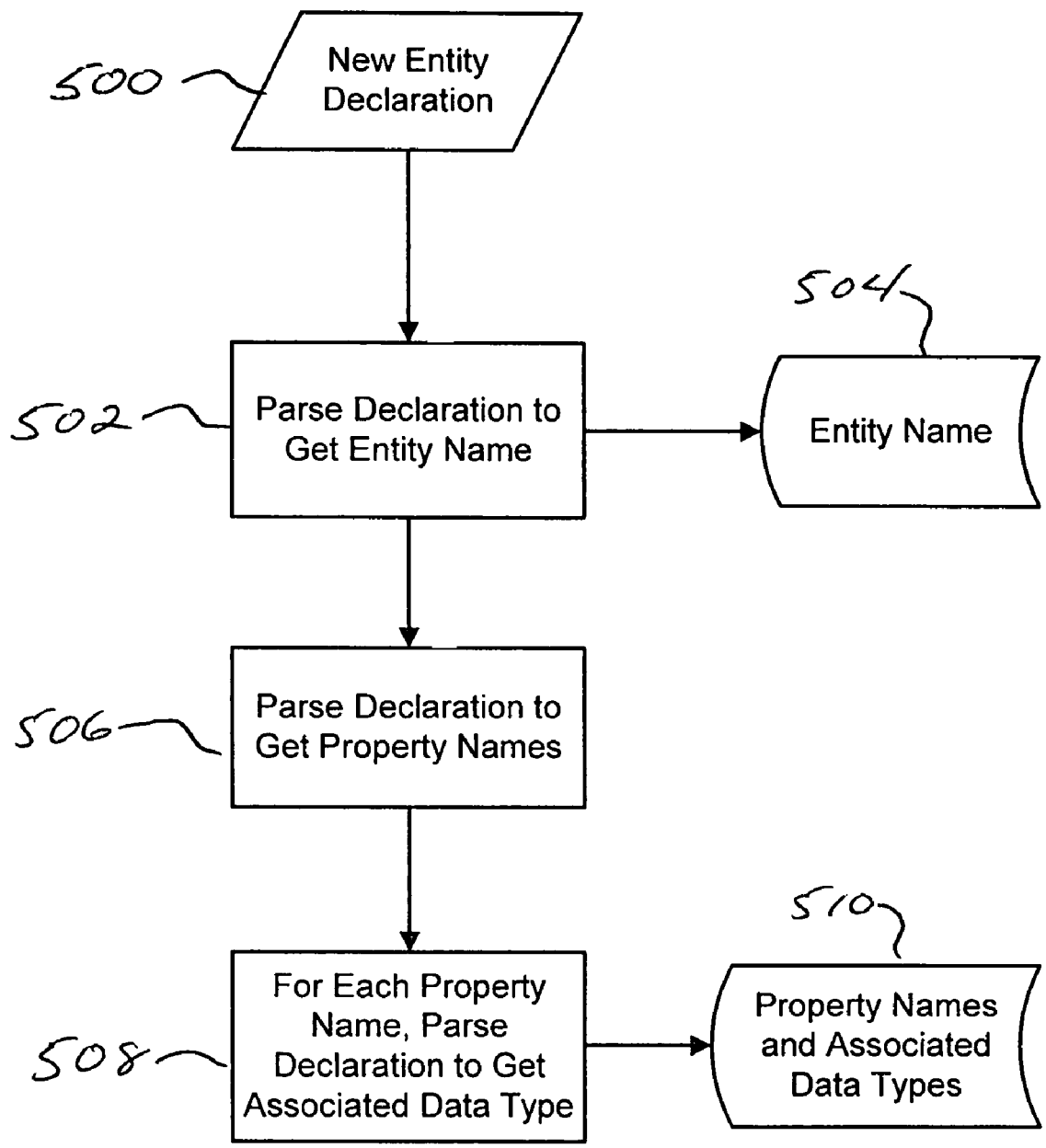
FIG. 5 is a flow diagram illustrating a method for parsing a new entity declaration into name and data type structures for use in generating an autonomous catalog system, according to an exemplary embodiment of the invention.

FIG. 5 is a flow diagram illustrating a method for parsing a new entity definition into name and data type structures for use in generating an autonomous catalog system according to an exemplary embodiment of the invention. For example, FIG. 5 illustrates a system and method for implementing the declaration interface module (400) (FIG. 4) according to an exemplary embodiment of the invention.

Referring now to FIG. 5, initially, a new entity declaration (500) is received for processing. As noted above, the entity declaration (500) may be described using an application-dependent language or application-independent language. The entity declaration (500) is parsed to determine the "name" of the declared entity (502), and the parsed entity name (504) is stored for subsequent access in downstream processing. In the above example, the entity name Soda will be stored. Further, the declaration is parsed to obtain the property names (506) of the declared entity. For each property name, the declaration is further parsed to obtain the corresponding data type, and the parsed property names and corresponding data types (510) are stored for subsequent access in downstream processing. In the above example, the entity properties Brand, Size, and UPC (and corresponding data types) will be parsed and stored.

Figure 6:
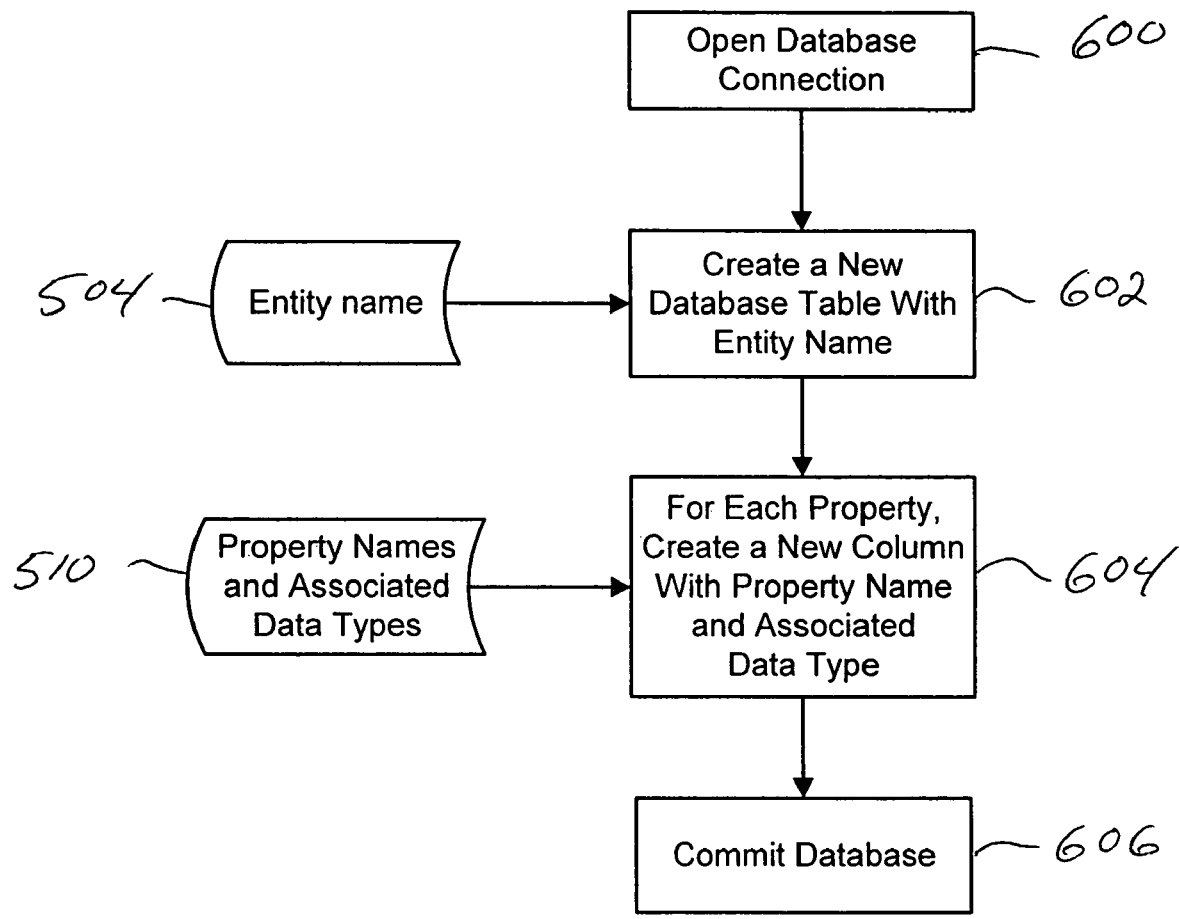
FIG. 6 is a flow diagram illustrating a method for automatically creating a persistent storage structure in the form of a database table according to an exemplary embodiment of the invention.

FIG. 6 is a flow diagram illustrating a method for creating persistent storage structure according to an exemplary embodiment of the invention. For example, FIG. 6 illustrates a system and method for implementing the persistence (406) and storage mapping (414) modules (FIG. 4) for creating a database table for a relational database according to exemplary embodiments of the invention. For purposes of discussion, with no loss of generality, it is assumed that the persistent storage is a relational database that accepts SQL (Structured Query Language) queries/requests.

Referring now to FIG. 6, initially, a database connection is opened (600). A SQL statement for creating a new database table is automatically generated using, for example, the parsed entity name (504) and the entity property names and associated data types (510). More specifically, a create table SQL statement is generated by defining a new database table with the entity name (602). In one exemplary embodiment using SQL and a relational database, and using the entity name Soda in the above example, a create table SQL statement begins with "CREATE TABLE SODA". In other exemplary embodiments of the invention, the entity name (504) can be transformed or altered to comply with certain requirements of the database management system, as is understood by those of ordinary skill in the art (a detailed discussion of which is beyond the scope of the present invention).

Then, generation of the create table statement continues by defining a new column for the database table for each property name and corresponding data type (604). More specifically, a table column is created for each property based on its data type and the property names are used as column names. For example, since the entity Soda comprises the properties Brand, Size and UPC, the create table SQL statement is further expanded as follows:

"(BRAND CHARACTER (10) NOT NULL, SIZE BIGINT NOT NULL, UPC CHARACTER (10) NOT NULL)".

In the exemplary SQL statement, the Brand column has enough space for ten characters. The Size column can store an integer. The UPC column also has enough space for ten characters. Finally, the exemplary SQL statement is appended with database user space clause. The complete table creation statement is as follows:

"CREATE TABLE SODA (BRAND CHARACTER (10) NOT NULL, SIZE BIGINT NOT NULL, UPC CHARACTER (10) NOT NULL) IN "USERSPACE";"

Once the table creation statement is generated, the statement is issued to the database to create a table (606) having a structure as defined in the statement. In the above example, it is assumed that a database table SODA is created.

Figure 7:
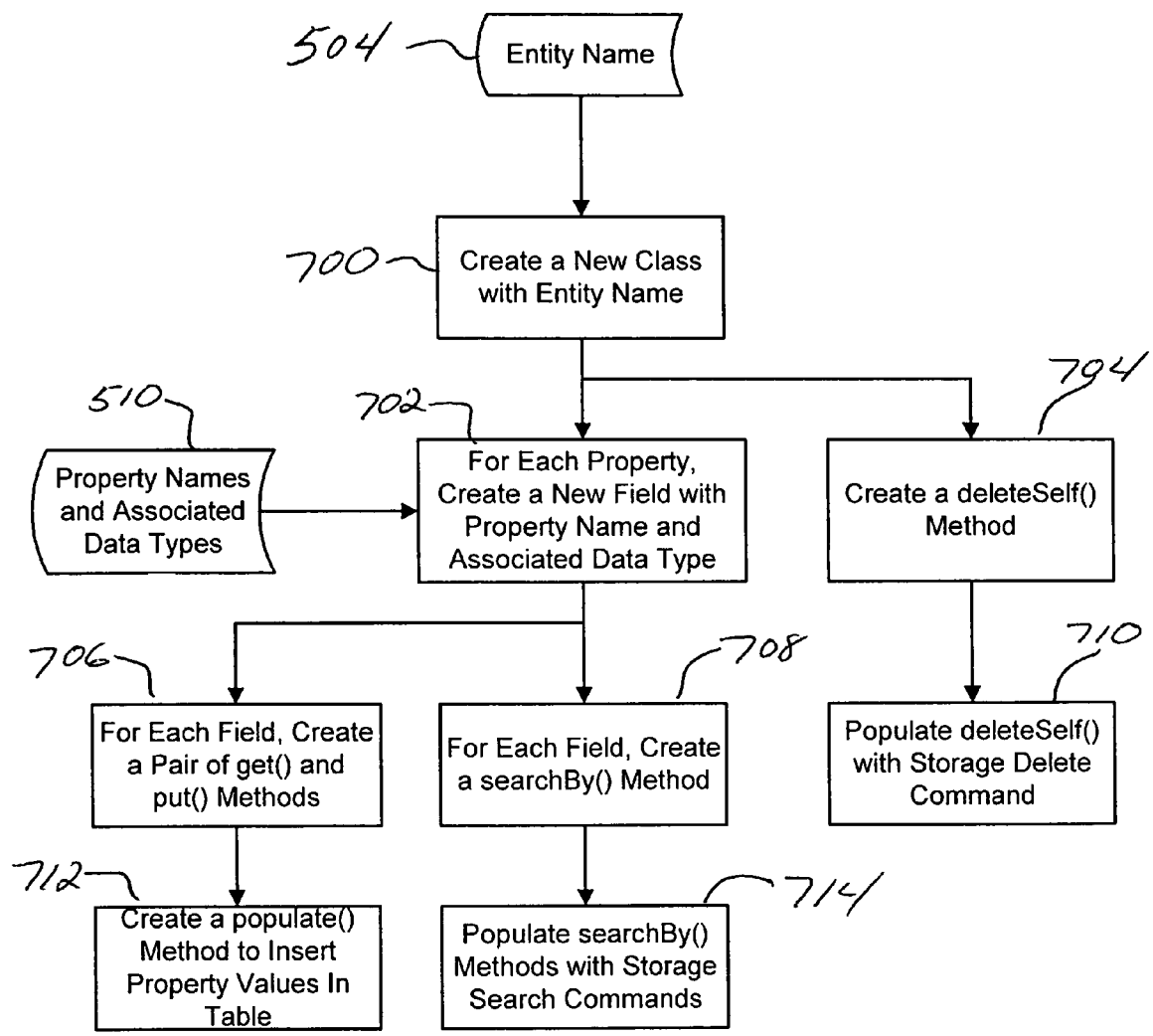
FIG. 7 is a flow diagram illustrating a method for automatically generating a software class that provides methods for accessing, searching and deleting entity instances, according to an exemplary embodiment of the invention.

FIG. 7 is a flow diagram illustrating a method for automatically generating a software class that provides methods for accessing, searching and deleting entity instances, according to an exemplary embodiment of the invention. For example, FIG. 7 illustrates a system and method for implementing the interface module (404) (FIG. 4) for the autonomous catalog (403) according to an exemplary embodiment of the invention. For purposes of discussion, without loss of generality, it is assumed that the Java programming language is employed for the autonomous catalog system of FIG. 4.

Referring now to FIG. 7, initially, a new software (Java) class is created (700), which is named after the stored entity name (504) (i.e., Soda using the above example). One or more members of the new class will then be declared with the names and data types of entity properties (510). More specifically, for each property, a new field is created with the property name and associated data type (702). By way of example, using the above Soda example, an exemplary Java skeleton of the class is as follows:

```
public class Soda {
    public String Brand;
    public int Size;
    public String UPC;
}
```

Next, for each field (property), a pair of get( ) and put( ) methods are created (706). In addition, a searchBy( ) method is created for each property (708). Further, a deleteSelf( ) method will be created (704) so that the class can destroy its own instance. By way of example using the above Soda example, the exemplary Java skeleton of the class is expanded as follows:

```
public class Soda {
    public String Brand;
    public int Size;
    public String UPC;
    public String getBrand( ) {
        return Brand; }
    public int getSize( ) {
        return Size; }
    public String getUPC( ) {
        return UPC; }
    public void setBrand(String brand) {
        Brand = brand; }
    public void setSize(int size) {
        Size = size; }
    public void setUPC(String uPC) {
        UPC = uPC; }
    public Soda [ ] searchByBrand(String brand) {
        return null; }
    public Soda [ ] searchBySize(int size) {
        return null; }
    public Soda [ ] searchByUPC(String uPC) {
        return null; }
    public void deleteSelf( ) {
    }
}
```

Figure 8:
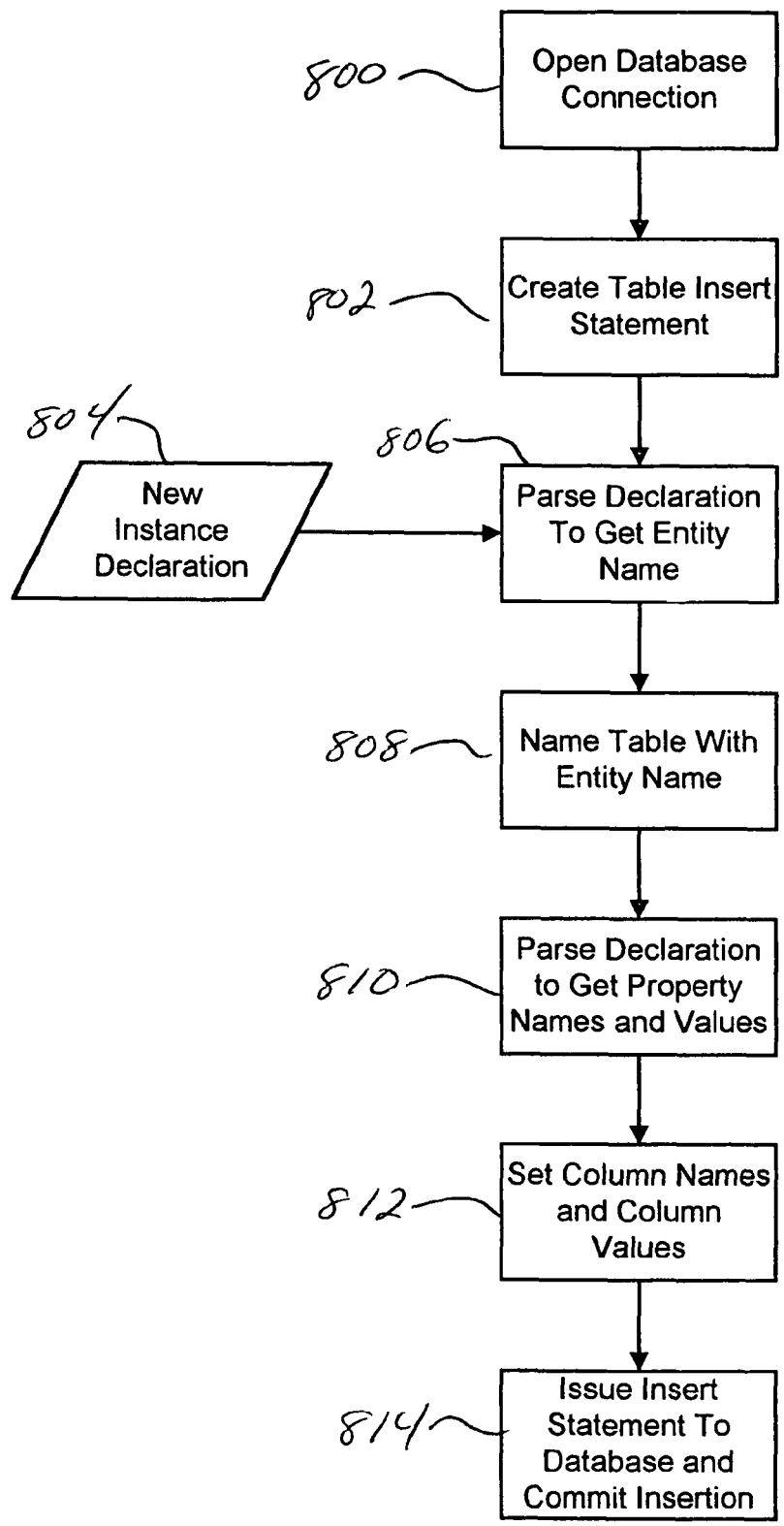
FIG. 8 is a flow diagram illustrating a method for automatically populating instance data into a database table, according to an exemplary embodiment of the invention.

Further, a populate( ) method is created to insert property values into the SODA table (712). The exemplary embodiment of FIG. 8 illustrate an implementation of the populate( ) method. In addition, the deleteSelf( ) method is populated with a storage delete command (710), e.g., an SQL statement to delete the row representing the instance from the SODA table (710). A procedure to generate the SQL update is similar to FIG. 8 and thus will not be repeated here. For completeness, an exemplary deleteSelf( ) statement is illustrated for reference:

"DELETE FROM SODA WHERE BRAND=this.Brand AND SIZE=this.Size AND UPC=this.UPC"

The exemplary Java class skeleton, which has the populate( ) and deleteSelf( ) method populated, is as follows:

```
public class Soda {
    public String Brand;
    public int Size;
    public String UPC;
    public String getBrand( ) {
        return Brand; }
    public int getSize( ) {
        return Size; }
    public String getUPC( ) {
        return UPC; }
    public void setBrand(String brand) {
        Brand = brand; }
    public void setSize(int size) {
        Size = size; }
    public void setUPC(String uPC) {
        UPC = uPC; }
    public Soda [ ] searchByBrand(String brand) {
        return null; }
    public Soda [ ] searchBySize(int size) {
        return null; }
    public Soda [ ] searchByUPC(String uPC) {
        return null; }
    public void deleteSelf( ) {
        execute the SQL statement "DELETE FROM SODA WHERE BRAND = this.Brand AND SIZE = this.Size AND UPC = this.UPC";
        }
    public void populate( ) {
        execute the SQL statement "INSERT INTO SODA (BRAND, SIZE, UPC) VALUES (this.Brand, this.Size, this.UPC)";
        }
}
```

Furthermore, the searchBy( ) methods for the properties are populated with database query and retrieval statements (714). More specifically, by way of example, the searchBy( ) method looks for matches of Soda instances with specified conditions. For instance, the query searchByBrand("Diet-Coke") requests all Soda instances whose Brand property is "Diet Coke". In one exemplary embodiment, the result that is returned comprises an array of Soda classes with the property values populated:

```
public Soda [ ] searchByBrand(String brand) {
    execute the SQL statement "SELECT * FROM SODA WHERE BRAND = "brand" ";
    For each instance match, instantiate a new Soda object;
    Set properties of the new Soda object with return values from the SQL statement;
    Return all the instantiated Soda objects as an array;
}
```

In another exemplary embodiment, the searchBy( ) method syntax can be extended using additional operators for fuzzy matching and number comparisons, for example, as is readily understood by those of ordinary skill in the art.

The exemplary Java class skeleton, which has all the methods populated, is as follows:

```
public class Soda {
    public String Brand;
    public int Size;
```

```
    public String UPC;
    public String getBrand( ) {
        return Brand; }
    public int getSize( ) {
        return Size; }
    public String getUPC( ) {
        return UPC; }
    public void setBrand(String brand) {
        Brand = brand; }
    public void setSize(int size) {
        Size = size; }
    public void setUPC(String uPC) {
        UPC = uPC; }
    public Soda [ ] searchByBrand(String brand) {
        execute the SQL statement "SELECT * FROM SODA WHERE BRAND = "brand" ";
```

For each instance match, instantiate a new Soda object;
Set properties of the new Soda object with return values from the SQL statement;
Return all the instantiated Soda objects as an array;

```
}
    public Soda [ ] searchBySize(int size) {
        execute the SQL statement "SELECT * FROM SODA WHERE SIZE = size";
        For each instance match, instantiate a new Soda object;
        Set properties of the new Soda object with return values from the SQL statement;
        Return all the instantiated Soda objects as an array;
}
    public Soda [ ] searchByUPC(String uPC) {
        execute the SQL statement "SELECT * FROM SODA WHERE UPC = "uPC" ";
        For each instance match, instantiate a new Soda object;
        Set properties of the new Soda object with return values from the SQL statement;
        Return all the instantiated Soda objects as an array;
}
    public void deleteSelf( ) {
        execute the SQL statement "DELETE FROM SODA WHERE BRAND = this.Brand AND SIZE = this.Size AND UPC = this.UPC";
        }
    public void populate( ) {
        execute the SQL statement "INSERT INTO SODA (BRAND, SIZE, UPC) VALUES (this.Brand, this.Size, this.UPC)";
        }
}
```

In the above exemplary embodiment, the newly generated Soda class, which accesses the newly created Soda table, can now be called by other applications, for example, to populate, search and/or delete instances of Soda. Although the above exemplary systems and methods describe an autonomous method for creating a catalog for Sodas, those of ordinary skill in the art will readily appreciated that syntheses and creation of new classes and tables for additional declared entities can be performed using the same procedures.

FIG. 8 is a flow diagram illustrating a method for populating instance data into a database table, according to an exemplary embodiment of the invention. For example, FIG. 8 illustrates a system and method for implementing step (712) (FIG. 7). Continuing by way of example with the Soda example, it is assumed in FIG. 8 that the Soda database table has been created and that a new instance having catalog content is processed to populate such catalog content into the Soda table.

Referring to FIG. 8, initially, a database connection is open (800). Then, creation of an SQL insert statement begins with "INSERT INTO" (802). A new entity instance declaration for Soda is received (804) and parsed to obtain the entity name (806). By way of example, the new entity instance for Soda may have the following properties and value: Brand="Diet Coke", Size=12 oz, and UPC=129100. In the table insert statement, the database table is named with the entity name (808). The instance declaration is parsed to obtain the names and values for each property (810). The parsed property names and values are then used to generate the remainder of the insert statement (812). Using the above exemplary Soda instance, an exemplary SQL insert statement is as follows:

"INSERT INTO SODA (BRAND, SIZE, UPC) VALUES ('Diet Coke', 12, '129100');"

Alternatively, if the new instance has only Brand and Size information, the SQL insert statement can be altered to include column names as follows:

"INSERT INTO SODA (BRAND, SIZE) VALUES ('Diet Coke', 12);"

The insert statement is then issued to the database and the SQL operation "commit" is invoked to write the instance data to persistent memory (814).

Figure 9:
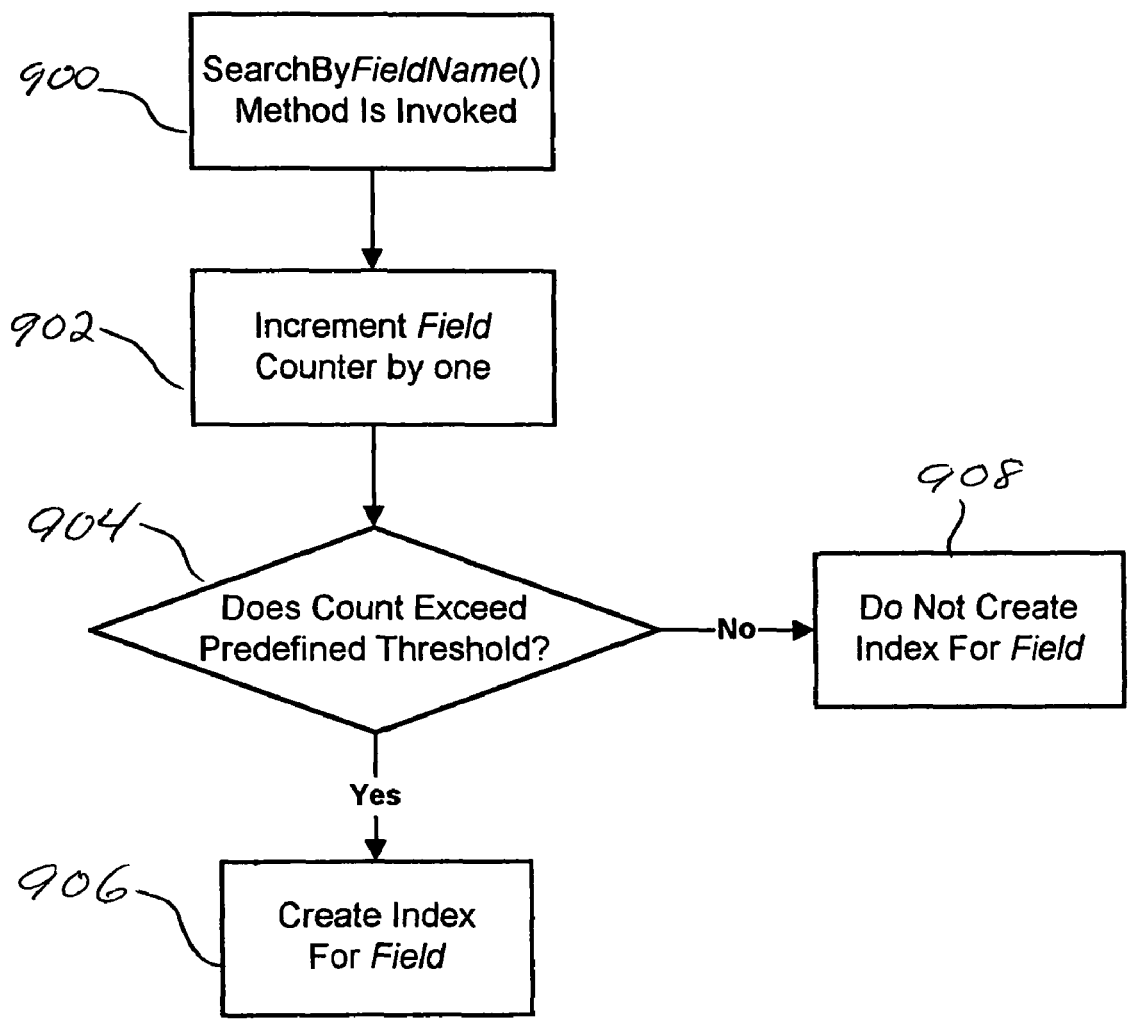
FIG. 9 is a flow diagram illustrating a method for automatically creating an index for object instance data based on access history, according to an exemplary embodiment of the invention.

FIG. 9 is a flow diagram illustrating a method for automatically creating an index for object instance data based on access history, according to an exemplary embodiment of the invention. For example, FIG. 9 illustrates a system and method for implementing the access history (410) and index creation (416) modules (FIG. 4).

Referring to now to FIG. 9, when a searchByFieldName( ) method is invoked for a given database table (900), a matched field counter for the requested field (property) name is incremented by one (902). In one exemplary embodiment, each field (table column) has a counter. If the counter number exceeds a preset threshold (affirmative determination in 904), an index will be created for the table field (property) (906). By way of the above Soda example for a relational database, a command for creating an index for the UPC column of the table Soda can be as follows:

"CREATE INDEX I_UPC ON SODA (UPC ASC) PCTFREE 10 MINPCTUSED 10;"

On the other hand, if the count does not exceed the predefined threshold (negative determination in 904), no index will be created. It is to be appreciated that the exemplary systems and methods described in FIG. 9 can be implemented to enhance access performance for an autonomous persistent storage system according to the invention.

Figure 10:
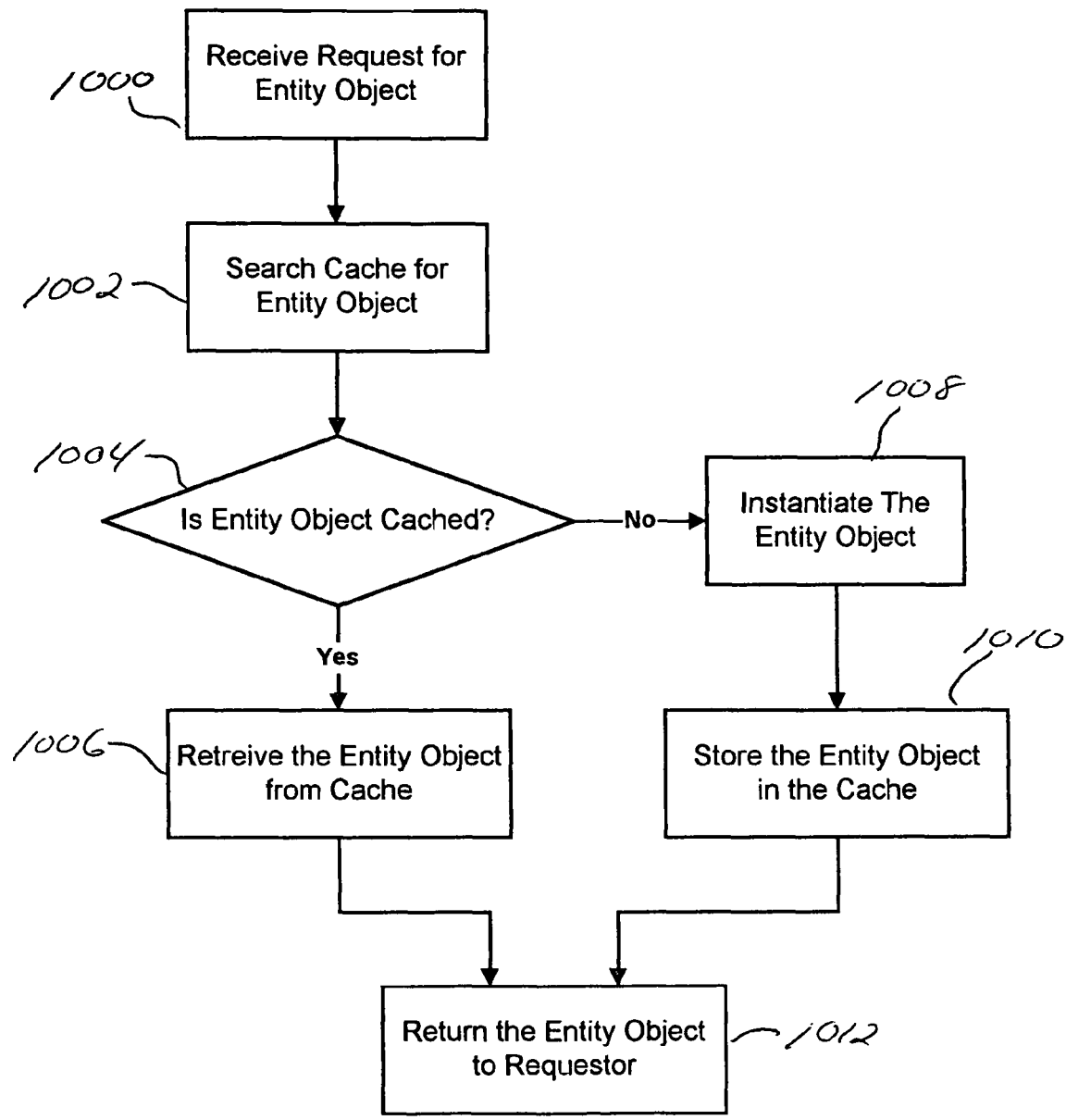
FIG. 10 is a flow diagram illustrating a method for implementing a cache to optimize instance access performance, according to an exemplary embodiment of the invention.

FIG. 10 is a flow diagram illustrating a method for implementing a cache to optimize instance access performance, according to an exemplary embodiment of the invention. For example, FIG. 10 illustrates a system and method for implementing the cache module (412) (FIG. 4). Initially, when a request for an entity object is received (1000), a cache memory will be searched for the requested object (1002). If the object is cached (affirmative determination in 1004), the object is retrieved from the cache (1006) and returned (1012). If the object is not cached (negative determination in 1002), a new entity object is instantiated (1008) by reading the object from the persisted memory to RAM, for example. The instantiated entity object is cached (1010) and returned (1012).

It is to be appreciated that the exemplary systems and methods described herein in accordance with the present invention may be efficiently and effectively implemented for providing persistent data management in a variety of enterprise applications such as human resource management (HR), enterprise resource management (ERP), customer relationship management (CRM), electronic commerce (EC), etc. Indeed, although such enterprise applications can implement a wide range of different catalog structures for various purposes, the present invention provides mechanisms for abstracting and automating catalog functions in the whole lifecycle, thereby enabling automatic and dynamic adaptation to product heterogeneity and, thus, minimizing the total cost of ownership.

For example, in one exemplary embodiment, the present invention provides mechanisms for automatically and dynamically creating new database tables and new access classes to adapt to product heterogeneity, without requiring manual customization. For example, an autonomous catalog system according to an embodiment of the invention can start with as few as two tables and grow automatically according to the needs of catalog users. An autonomous catalog system supports the basic definition of catalog, which is a directory of things characterized by their properties. By leaving the definition of a "thing" and its "properties" to catalog users, an autonomous catalog system according to the present invention provides the flexibility to support virtually all catalog requirements regardless of the industry domain.

In addition, an autonomous catalog system according to an embodiment of the invention enables an application developer to focus on the core functionality of an enterprise application, without having to know details of the schema design and performance optimization for the catalog system to be implemented with the enterprise application.

Although exemplary embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A computer-implemented method for generating a persistent storage system, the method comprising the steps of:

receiving as input an entity definition of a persistent storage structure, wherein the entity definition comprises a declaration of an object, one or more properties of the object, and a data type for each property;

parsing a logical structure of the declared object from the entity definition by a processor, wherein the logical structure includes hierarchical associations between the properties and the data types;

generating automatically, by the processor, the persistent storage structure in a persistent storage medium based on the determined logical structure of the declared object;

generating automatically, by the processor, an interface within the persistent storage structure, wherein the interface comprises access object classes that are generated automatically by the processor to enable management of object instance data in the persistent storage structure, wherein each object is associated with a respective access object class for performing methods including a method for deleting the object instance data associated with the respective access object class;

generating automatically, by the processor, a database table within the persistent storage structure to store the object instance data, wherein the database table comprises a column for each property of the object and the column includes a counter that is incremented each time the corresponding property is accessed; and generating automatically, by the processor, an index to a property of the object if the counter corresponding to the property exceeds a predefined threshold.

2. The method of claim 1, wherein the persistent storage structure comprises a file directory.

3. The method of claim 1, wherein the persistent storage medium comprises a hard disk, a readable/writeable CD or a floppy disk.

4. The method of claim 1, wherein the method is implemented in a database system.

5. The method of claim 4, wherein the database system is a relational database.

6. The method of claim 1, wherein the step of automatically generating an interface for accessing the persistent storage medium comprises automatically creating methods for one of storing, retrieving and searching object instance data in the persistent storage medium.

7. The method of claim 1, further comprising the step of automatically adapting the persistent storage structure or the access interface for a new entity definition.

8. The method of claim 1, further comprising the step of automatically optimizing the persistent storage system to improve search efficiency or storage scalability.

9. The method of claim 1, further comprising automatically creating a cache memory for storing object instance data that is accessed from the persistent storage medium based on the index.

10. The method of claim 1, further comprising the steps of:
receiving an object instance declaration; and
automatically populating the persistent storage structure with object instance data.

11. A computer-readable medium embodying instructions executed by a processor to perform method steps for generating a persistent storage system, the method comprising the steps of:
receiving as input an entity definition of a persistence storage structure, wherein the entity definition comprises a declaration of an object, one or more properties of the object, and a data type for each property;
parsing a logical structure of the declared object from the entity definition, wherein the logical structure includes hierarchical associations between the properties and the data types;
generating automatically the persistent storage structure in a persistent storage medium based on the determined logical structure of the declared object;
generating automatically an interface within the persistent storage structure, wherein the interface comprises access object classes that are generated automatically to enable management of object instance data in the persistent storage structure, wherein each object is associated with a respective access object class for performing methods including a method for deleting the object instance data associated with the respective access object class;
generating automatically a database table within the persistent storage structure to store the object instance data, wherein the database table comprises a column for each property of the object and the column includes a counter that is incremented each time the corresponding property is accessed; and
generating automatically an index to a property of the object if the counter corresponding to the property exceeds a predefined threshold.

12. The computer-readable medium of claim 11, wherein the persistent storage structure comprises a file directory.

13. The computer-readable medium of claim 11, wherein the instructions for automatically generating an interface for accessing the persistent storage medium comprise instructions for automatically creating methods for one of storing, retrieving and searching object instance data in the persistent storage medium.

14. The computer-readable medium of claim 11, further comprising instructions for automatically adapting the persistent storage structure or the access interface for a new entity definition.

15. The computer-readable medium of claim 11, further comprising instructions for automatically optimizing the persistent storage system to improve search efficiency or storage scalability.

16. The computer-readable medium of claim 11, further comprising instructions for automatically creating a cache memory for storing object instance data that is accessed from the persistent storage medium based on the index.

17. The computer-readable medium of claim 11, further comprising instructions for performing the steps of:
receiving an object instance declaration; and
automatically populating the persistent storage structure with object instance data.

18. A persistent storage system, comprising:
an interface for receiving an entity definition of a persistent storage structure, the entity definition comprising a declaration of an object, one or more properties of the object, and a data type for each property, and for parsing a logical structure of the declared object from the entity definition, wherein the logical structure includes hierarchical associations between the properties and the data types; and
a utility module for automatically configuring the persistent storage structure in a persistent storage medium based on the logical structure and properties of the declared object, wherein the persistent storage structure is automatically configured to comprise:
a persistence module and a storage mapping module for automatically generating a database table within the persistent storage structure for storing object instance data, wherein the database table comprises a column for each property of the object and the column includes a counter for each property that is incremented each time the corresponding property is accessed;
an interface module comprising access object classes that are generated automatically to enable management of the object instance data in the persistent storage structure, wherein each object is associated with a respective access object class for performing methods including a method for deleting the object instance data associated with the respective access object class;
a search module for searching the database table for one of the properties of the object, wherein the counter corresponding to the one of the properties is incremented upon searching for the one of the properties;
an access history module for monitoring the counter of each property, and for invoking an index creation module upon one of the counters exceeding a predefined threshold, wherein an index to each property is only generated upon the corresponding counter exceeding the predefined threshold.

19. A database system comprising the persistent storage system of claim 18.

20. An enterprise application comprising the persistent storage system of claim 18.

21. The system of claim 18, wherein the persistent storage structure comprises a file directory.

22. The system of claim 18, wherein the access methods comprise methods for one of storing, retrieving, searching, and removing object instance data in the persistent storage medium.

23. The system of claim 18, wherein the persistent storage system is an electronic catalog system.

24. The system of claim 18, wherein the persistent storage structure further comprises a cache memory module for automatically storing object instance data that is accessed from the persistent storage medium based on the index.

25. The system of claim 18, wherein the persistent storage system further comprises means for automatically populating the persistent storage structure with object instance data that is input to the system.

26. An e-service that implements the system of claim 18 for providing a data management service based on a fee agreement or service level agreement.

27. A computer-implemented method for managing an object and its persistent storage image, the method comprising the steps of:

receiving as input an entity definition, wherein the entity definition comprises a declaration of the object, one or more properties of the object, and a data type for each property;

parsing a logical structure of the declared object from the entity definition by a processor, wherein the logical structure includes hierarchical associations between the properties and the data types;

generating and maintaining automatically, by the processor, a mapping between an instance of the object and its persistent storage image based on the entity definition, wherein the persistent storage image is stored in a persistent medium;

generating automatically, by the processor, an interface within a persistent storage structure, wherein the interface comprises access object classes that are generated automatically to enable management of object instance data in the persistent storage structure, wherein each object is associated with a respective access object class for performing methods including a method for deleting the object instance data associated with the respective access object class;

generating automatically, by the processor, a database table within the persistent storage structure to store the object instance data, wherein the database table comprises a column for each property of the object and the column includes a counter that is incremented each time the corresponding property is accessed;

generating automatically, by the processor, an index to a property of the object if the counter corresponding to the property exceeds a predefined threshold; and measuring automatically, by the processor, a frequency of accessing the instance of the object and, if it is determined that the measured frequency is above a preset threshold, storing the instance of the object in a cache.

28. The method of claim 27, further comprising the step of automatically measuring a frequency of searching by values of a property of the object.

* * * * *